United States Patent
Ferlitsch

(10) Patent No.: US 7,573,605 B2
(45) Date of Patent: Aug. 11, 2009

(54) METHOD AND SYSTEM FOR DISPLAYING FOR SELECTION FORMAT-INDEPENDENT AND FORMAT-SPECIFIC IMAGING OPTIONS

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 800 days.

(21) Appl. No.: 10/860,884

(22) Filed: Jun. 3, 2004

(65) Prior Publication Data

US 2005/0280844 A1    Dec. 22, 2005

(51) Int. Cl.
- G06K 15/02 (2006.01)
- H04N 1/46 (2006.01)
- G03G 15/00 (2006.01)
- G06F 3/12 (2006.01)

(52) U.S. Cl. .................. 358/1.9; 358/537; 358/538; 358/1.1; 399/81

(58) Field of Classification Search .................. 358/1.9, 358/1.13, 1.14, 1.15, 1.16, 1.1, 1.2, 1.12, 358/537, 538; 710/15; 703/24; 709/220, 709/217; 345/735; 399/81

See application file for complete search history.

(56) References Cited

U.S. PATENT DOCUMENTS

| | | | |
|---|---|---|---|
| 5,996,029 A * | 11/1999 | Sugiyama et al. | 710/15 |
| 6,335,795 B1 * | 1/2002 | Neuhard et al. | 358/1.15 |
| 6,538,763 B1 | 3/2003 | Klosterman et al. | |
| 7,154,617 B2 * | 12/2006 | Ikeno | 358/1.13 |
| 2002/0145627 A1 | 10/2002 | Whitmarsh et al. | |
| 2002/0186393 A1 | 12/2002 | Pochuev et al. | |
| 2003/0011801 A1 | 1/2003 | Simpson et al. | |
| 2003/0202010 A1 | 10/2003 | Kerby et al. | |
| 2003/0231328 A1 | 12/2003 | Chapin et al. | |
| 2004/0153530 A1 * | 8/2004 | Machida | 709/220 |

* cited by examiner

Primary Examiner—Edward L Coles
Assistant Examiner—Charlotte M Baker
(74) Attorney, Agent, or Firm—Austin Rapp & Hardman

(57) ABSTRACT

A method and system for displaying for selection format-independent and format-specific imaging options for direct imaging. The method and system determines the type of imaging device that is to image an object file. It then determines and displays the format-independent imaging options supported by the imaging device, based on the type of imaging device. It determines the format of the object file. It then displays the imaging options supported by the printer that are specific to the format of the object file, based on the type of imaging device and the format of the object file. The method and system are particularly useful for direct imaging to a printer.

56 Claims, 6 Drawing Sheets

METHOD AND SYSTEM FOR DISPLAYING FOR SELECTION FORMAT-INDEPENDENT AND FORMAT-SPECIFIC IMAGING OPTIONS

BACKGROUND OF THE INVENTION

This invention relates to methods and systems for providing a direct imaging user interface for format related options, particularly for displaying only format-independent imaging options and imaging options specific to an object file to be imaged.

In general, a digitized, electronic image, such as the text of a document, or some graphical image, or a combination of both, may be captured as an object file having a particular format, such as vector or 3D computer graphics files, Tag Image File Format ("TIFF") files, Portable Document Format ("PDF"), Joint Photographics Experts Group ("JPEG"), File Interchange Format ("JFIF"), or Microsoft Word® files. An imaging device, such as a printer, may or may not support the format by which the object file is captured.

Indeed, many source devices, such as an applications program on a host computer or a web site, by which an object file is produced and the destination devices adapted to produce an image of an object file, such as a printer, support different respective formats and protocols. For example, a host computer may be running Microsoft Word®, which has a proprietary format, while an associated printer may be adapted only to use Hewlett Packard Printer Control Language ("PCL") or Adobe Postscript® ("PS") formats. To overcome such language barriers, either the host computer or the printer may have format translation capability, such as using a Graphics Device Interface ("GDI") and a corresponding driver on the host computer to translate an object file format, for example MS-Word, to a printer ready format, for example, PCL.

Accordingly, when a user causes an object file to be submitted directly to an imaging device ("direct imaging") without converting the file to a device-ready format, the imaging options supported by the imaging device may differ from those of the file format. Also, in some cases, a user may want an object file in a rendered imaging format, such as PCL or PS, to be submitted to an imaging device for direct imaging with additional or modified imaging settings that are specific to the rendered imaging format and supported by the imaging device.

Typically, when a user causes an object file to be submitted directly to an imaging device, the data is converted to an imaging device-independent format using a service provided by the operating system of the source device, for example, GDI in Microsoft Windows®, which is then converted by an imaging driver supplied by the manufacturer of the imaging device into a device-specific rendered format, for example, a Page Description Language ("PDL"), such as PCL, or PS. Many modern imaging devices support more than one imaging language format ("personalities") for an imaging operation. For example, most digital imaging devices manufactured by Sharp Electronics Corp. support PCL, PCL Extended Language ("PCLXL") and Postscript ("PS"), as well as other PDLs). Each manufacturer typically ships a separate imaging driver for each imaging language format. Additionally, each imaging language format may have settings that are only supported by that format and not the others. In these cases, the imaging language format specific settings only appear in the corresponding imaging drivers, and not the others.

A growing number of modern imaging devices now support the direct submission and device based rendering of a limited number of object file formats, such as PDF, TIFF and JPEG. In these systems, the object file may be submitted to the device without conversion on the host into a device-specific rendering format. Typically, a manufacturer will provide a host side software application for specifying at least a limited number of job settings and despooling the object file to the device. For example, the imaging device may support an embedded web page for direct imaging, which can be accessed via a browser from the host. The web page typically contains some pre-determined job setting options which are supported by the device, for example, number of copies, whether pages are to be collated, whether duplex finishing is to be employed, and whether copies are to be stapled, and a means to specify the object files to print. The user provides the job settings and the location of the object file to the device via entries made into the web page. The imaging device then pulls the object file and renders it according to the specified settings. The Sharp Electronics Corp. AR-M277 digital imager is an example of a device with this capability. This prior art method is illustrated by FIG. 1, in which host computer 10, which implements the method, is connected to the internet 12 and a printer 14, and produces the UI 16, which may be viewed by a user 18 who also operates the computer 10.

The user interface ("UI") displayed on a web page is a universal UI for all valid object file formats. Accordingly, the UI generally either lists (1) only a subset of imaging options that are common across all language formats, or (2) a superset of settings that are applicable to some, but not necessarily all language formats. In the first case, the user is unable to select settings that are specific to the language format. In the second case, confusion may arise as to which object files the options apply.

In another method, the manufacturer provides a host side application for direct imaging which utilizes traditional host-based push imaging methods. Generally, the host side application provides a means for the user to specify settings for imaging, and for despooling the imaging job and associated functions using a traditional host based push method, for example, Line Printer Remote ("LPR"). The Xerox Corporation Document CentreWare® Direct Image submit tool is an example of this method. This prior art method is illustrated by FIG. 2, in which a host computer 20, which implements the method, is connected to a printer 22, and produces the UI 24, which may be viewed by a user 26 who also operates the computer 20.

In this second prior art method, an application program on the host computer may support a variety of printer models or configurations with varying capabilities and associated settings. Generally, the host application provides a universal UI for all possible supported models and associated configurations, and lists (1) only a subset of standard settings that are common across all base configurations for each of the supported printer models; (2) only a subset of standard settings that are common across all base and installable configurations for each of the supported models, even though a specific printer may not be installed for the capability; or (3) a superset of settings that are applicable to some, but not necessarily all printer models and associated configurations. This prior art method suffers the same drawback as the first described prior art method in that the UI only displays settings that are language format specific.

Therefore, a more effective method for of displaying and selecting language format specific imaging options for direct imaging, when one or more options are not applicable to one or more language formats of the object files, is desirable.

SUMMARY OF THE INVENTION

The present invention provides a method and system for displaying for selection format-independent imaging options and imaging options specific to one or more object files to be directly imaged. It determines the type of imaging device that is to image an object file. It then determines and displays the format-independent imaging options supported by the imaging device, based on the type of imaging device. It determines the format of the object file. It then displays the imaging options supported by the printer that are specific to the format of the object file, based on the type of imaging device and the format of the object file. The system and method are particularly useful for direct imaging to a printer.

It is to be understood that this summary is provided as a means of generally determining what follows in the drawings and detailed description of the invention and is not intended to limit the scope of the invention. Moreover, the objects, features and advantages of the invention will be more readily understood upon consideration of the following detailed description of the invention taken in conjunction with the accompanying drawings.

DETAILED DESCRIPTION OF THE INVENTION

Figure 1:
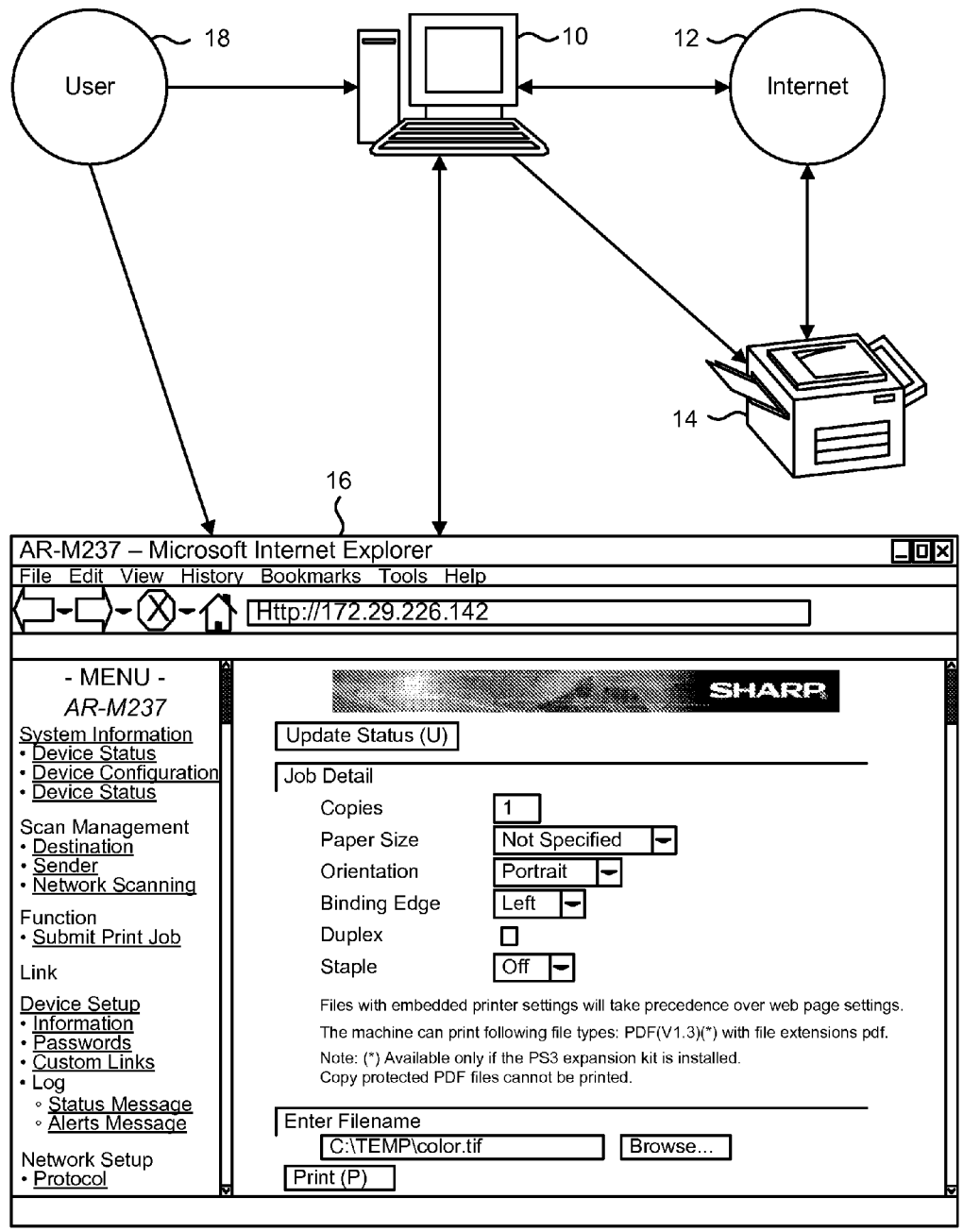
FIG. 1 is an illustration of an exemplary prior art system for pull printing an object file from an embedded web page to a printer and printing the file according to selections from limited print options.
Figure 2:
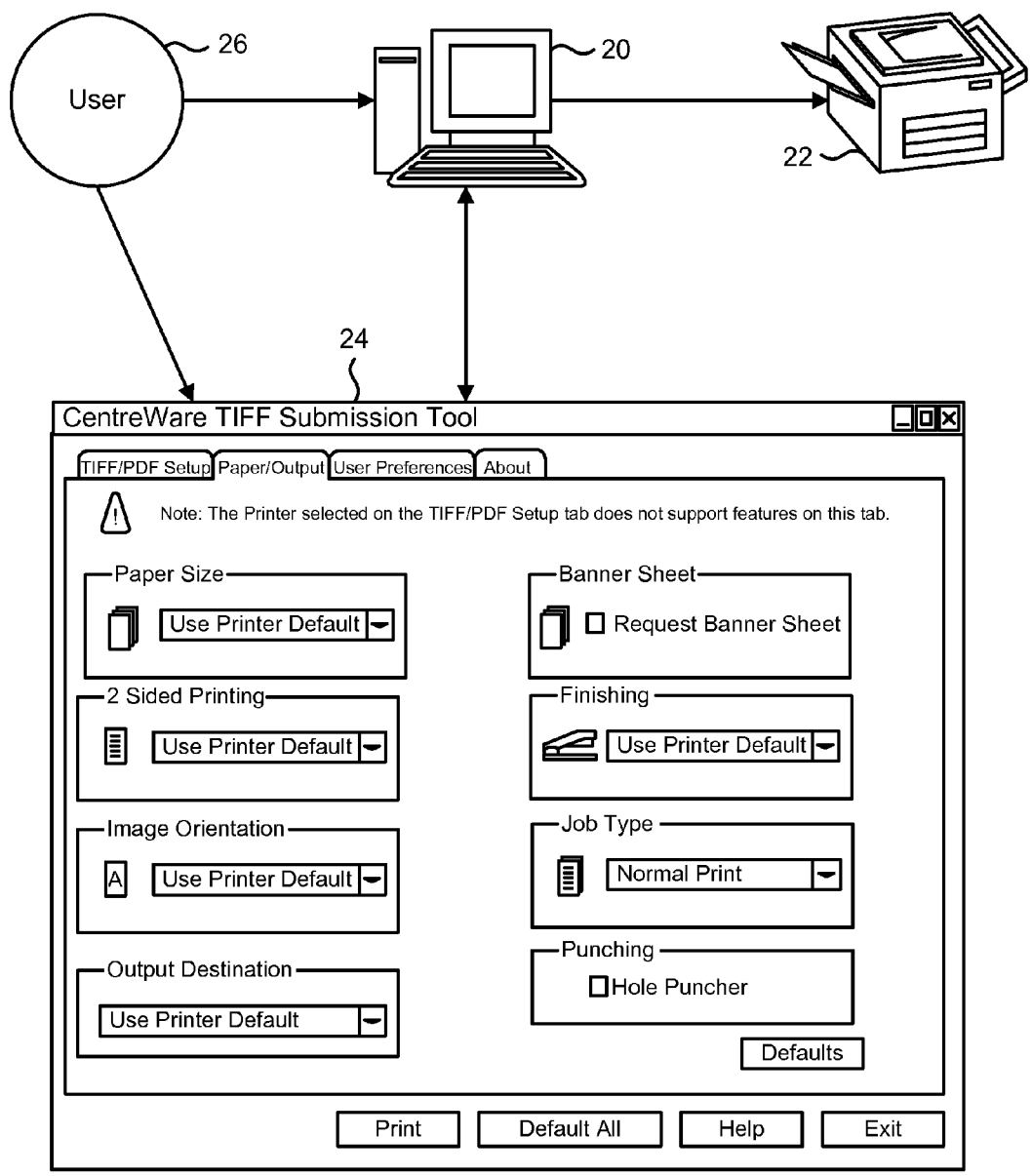
FIG. 2 is an illustration of an exemplary prior art system for direct submission of an object file from a processor to a printer for printing the file according to presumed capabilities of the printer.

According to the present invention, a user is able to directly submit an object file, such as a document, graphics data, or PDL data, to an imaging device for rendering of an image in at least one image format, without converting the object file to a format by which the imaging device can directly image the file, that is, for example, without converting the object file to printer-ready format in the case where the imaging device is a printer. In other words, the object file may be submitted directly to the imaging device in its native format. The imaging device is able to interpret the native format of the object file into the device specific format, such as printer engine ready format for printing a document, so as to render the image. The object file may be any of a variety of file types, such as a document file, a graphics file or PDL data.

The direct submit process, referred to herein as "direct imaging," may be host device based or imaging device based. In the case of host device direct imaging, the direct imaging process may operate as a software application running on a client or server computer. In the case of imaging device direct imaging, the process may operate as a firmware application on the imaging device, or some other intermediate device.

Most typically, direct imaging is used to submit imaging jobs for printing or facsimile transmission, but it is not limited thereto. Other imaging tasks include softcopy input copying, scanning, and document archive, retrieval and manipulation. Regardless of the application, the direct imaging process enables the user to select at least one object file for imaging by the imaging device. The object file may be stored on a hard-drive, as data in Random Access Memory ("RAM"), or extracted from any other suitable storage device or data source, including the internet or some other network. The process may also allow the submission of multiple object files, which may all have the same format or which may have different formats, to be imaged as a compound job, that is, rendered individually, or a composite job, that is, rendered as a whole.

In direct imaging, the user is further able to select imaging settings for how the object file is to be rendered, for example, the number of copies, the resolution, the scale, the placement, whether the image is duplex, whether hard copies are to be stapled, cropped or aligned, and whether compressed format is to be used. In some cases, the settings are globally specified, where they are to be applied to all input sources within the job submission; specified job wide, where they are to be applied across an entire input object file; or page specific, where they are to be applied to specific pages; or element specific, where they are to be applied to specific imaging elements. The User Interface ("UI") for displaying object files and imaging options may be, without limitation, an application based dialog, a device front panel, or a web page.

Selection of imaging options may be accomplished in any suitable way. For example, where the options are displayed in a window produced by an applications program or by a web page, selection may be made by keyboard or by a cursor. In the case of a device, the display panel may comprise touch screen technology so that the selection may be made by touching options where they are displayed on the screen.

Figure 3:
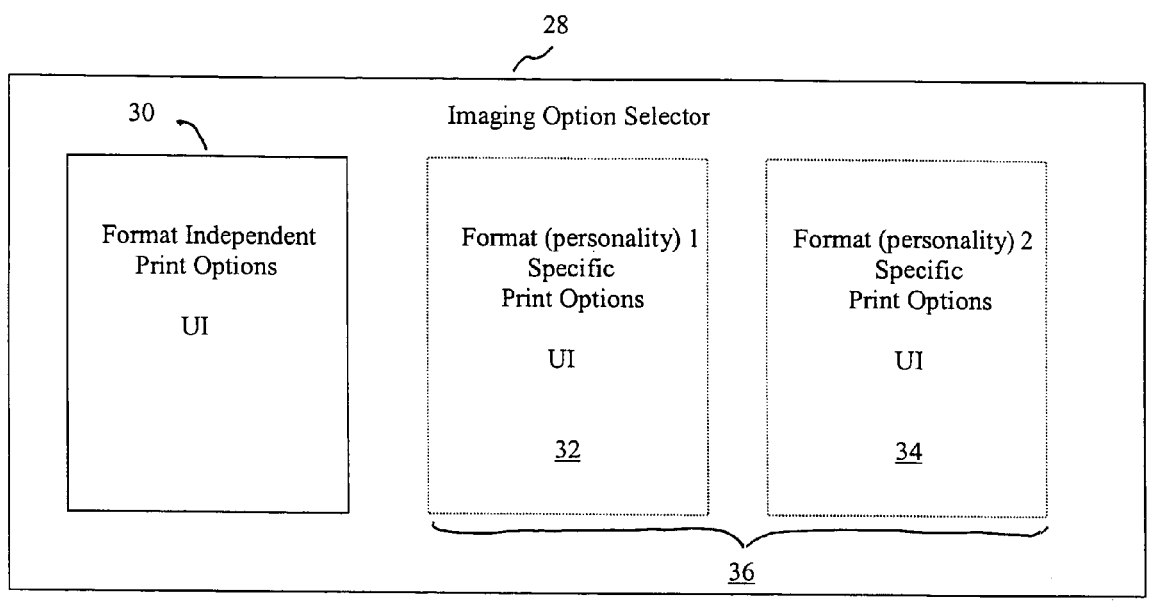
FIG. 3 is a diagrammatic representation of a dynamically-configurable print option user interface according to the present invention.

As shown in FIG. 3, in a preferred embodiment of the present invention the UI comprises a display of optional imaging settings, herein referred to as the imaging option selector 28. The imaging option selector is partitioned into a section of settings that are image format independent 30, and a section of settings that are image format specific 32. In the format-independent section, the settings may be further partitioned or grouped in any manner. In the format-specific section, the format-specific settings are logically grouped such that the user can clearly identify which settings correspond to which formats, as indicated by group 34 and group 36. For example, the UI may have a separate dialog, such as a "CPropertyPage" dialog in Microsoft Visual Studio 6.0, for each language format.

Figure 4:
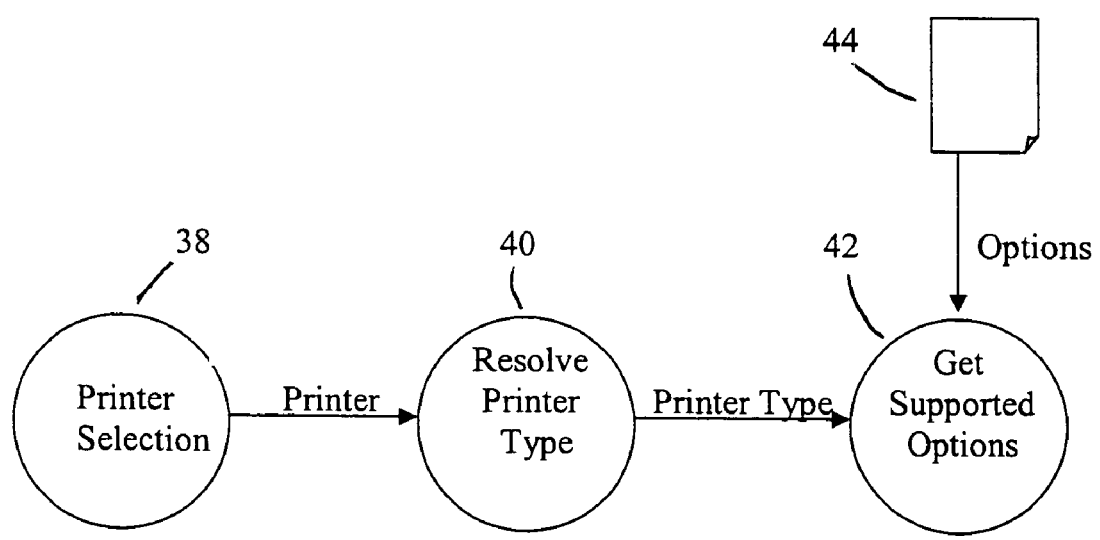
FIG. 4 is a diagram of a process for resolving the type of imaging device and determining format-independent device imaging options according to the present invention.

Turning now to FIG. 4, in response to a selection 38 by the user of an imaging operation from the imaging operation selector, the system of the preferred embodiment first determines, or "resolves", the type of imaging device 40, such as a printer, which is to image the object file and determines 42 the format-independent imaging options 44 that are supported by that type of imaging device. In the case of direct imaging, the imaging processor may send all or parts of the object file to more than one imaging device, such as in the case of a job splitting or broadcast operation.

The type of imaging device may be resolved by any suitable means, including, without limitation, (1) querying the imaging device for its model name using a device management protocol such as Simple Network Management Protocol ("SNMP"), and (2) querying a service or component of the operating system that is managing the imaging device, for example, a print spooler or device directory service, for information about the model name or other type classification information.

The format-independent imaging options may be determined by any suitable means, including, without limitation, (1) querying the imaging device using a device interface protocol such as Extensible Markup Language ("XML") to obtain format-independent options supported by the imaging device, (2) querying a service or component of the operating system that is managing the imaging device for information about the format-independent options supported by the device, and (3) querying an imaging device model database for information about the format-independent options supported by the device.

Figure 5:
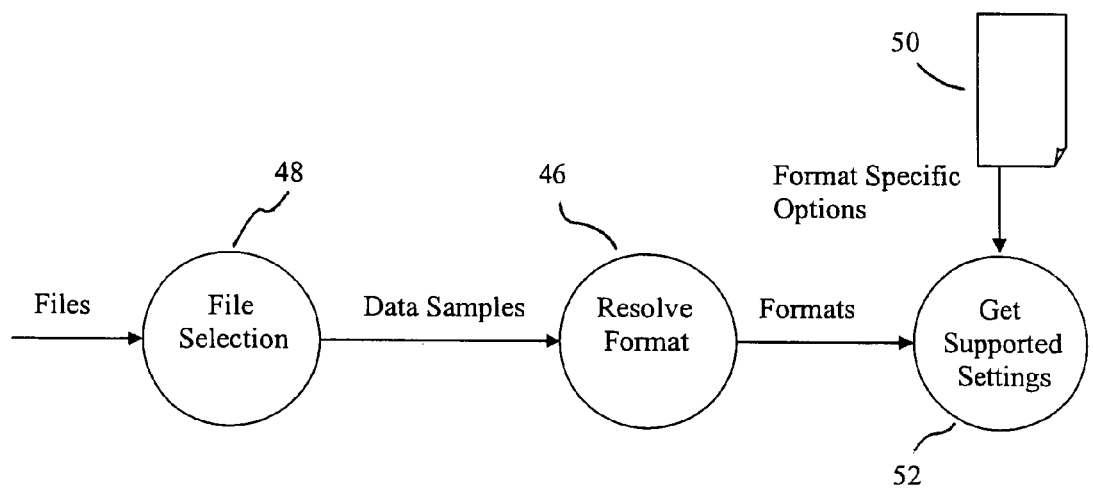
FIG. 5 is a diagram of a process for resolving the format of one or more object files to be imaged and determining format-specific device imaging options according to the present invention.

Format-specific options are determined, or resolved, as shown in FIG. 5. In the case of direct imaging, the preferred embodiment of the system of the present invention resolves the formats of the input object files 46 by any suitable means, once the object files are selected 48. Such means include, without limitation, (1) determining the format from the object file type, as by the file suffix, (2) determining the formats from unique identifying format sequences within the object files, such as so called "magic sequences" known in the art, and (3) simply accepting the format identifications given by the user.

After the object file formats have been determined, the direct imaging processor obtains the format-specific options 50 supported by the object file formats 52. The processor may determine format specific options by any suitable means, including, without limitation, those means used for resolving the format-independent options.

According to the present invention, the display of format-specific options is based on the input object files. For example, if the imaging device supports format specific imaging options for format types A, B and C, and the object file has format type A, then only the options for format type A will be displayed, not those for format types B or C.

If there are multiple input object files having different formats, then each of the corresponding format-specific options are available for display, but they may not necessarily be displayed all at once. All the format specific options may be displayed. Alternatively, only the format-specific options for identified input object files, such as subsets of input object files highlighted by the user within the UI, may be displayed. As another alternative, all the format-specific options may displayable, but only those associated with input object files identified by the user, as by highlighting, are currently displayed.

Figure 6:
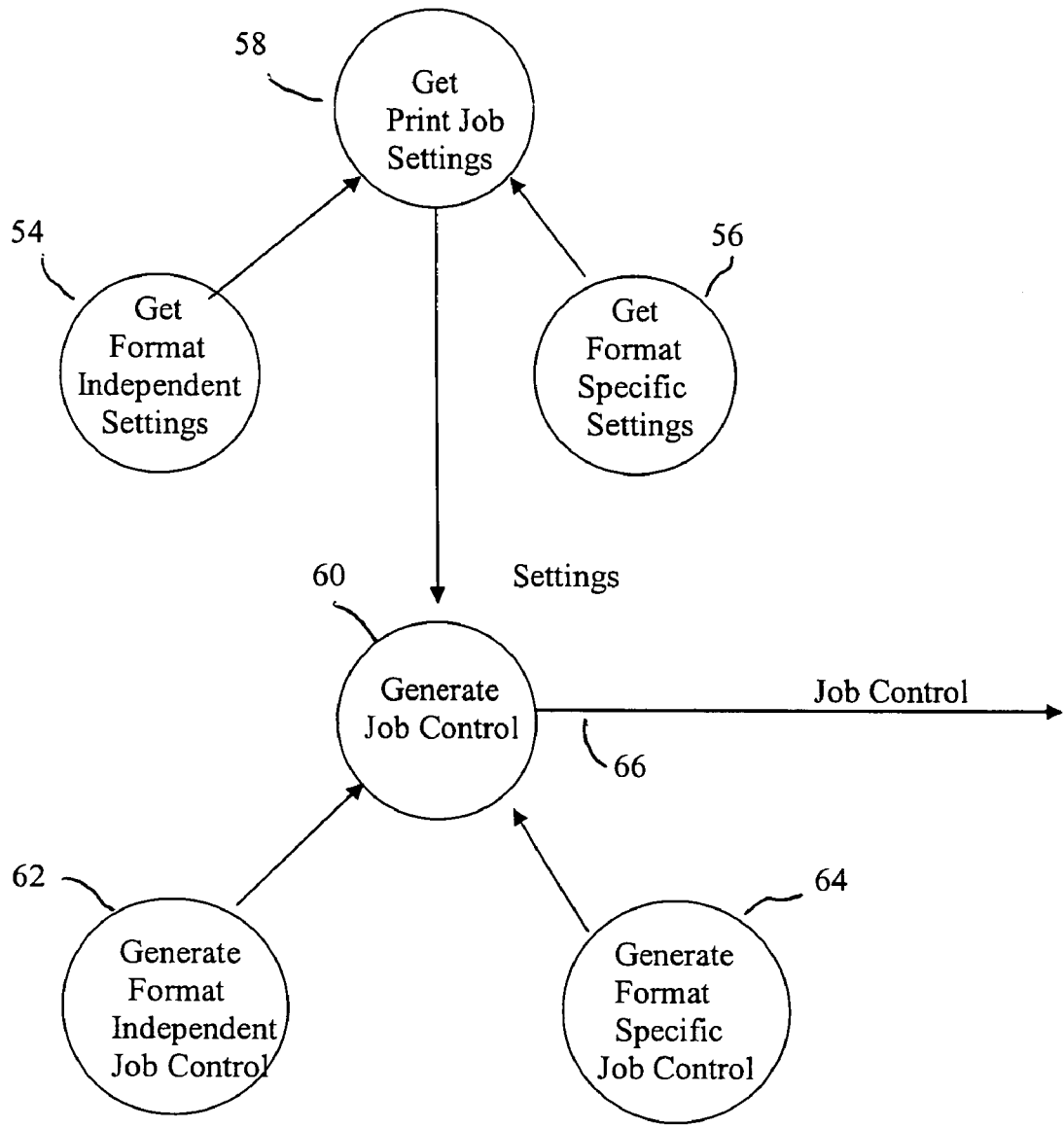
FIG. 6 is a diagram of a process for generating job control for format-independent and format-specific imaging option selections according to the present invention.

Turning now to FIG. 6, once the user has specified completely all of the options, the direct-imaging process proceeds to generate job specific control settings, page specific control settings, element specific control settings, or some combination thereof. The processor obtains all the settings for the format-independent options 54, each of the associated format-specific options 56, and the print job settings 58. These settings are then processed by a job control generation process 60, a page control generation process, or an element control generation process, or some combination thereof, which generates control commands for the format-independent options 62 and each of the associated format-specific options 64. The job control settings and the object file are then passed-66 to the imaging device, for example by de-spooling a spooled file over an imaging transport protocol such as "LPR", "9100", Internet Printing Protocol ("IPP") or the like.

For example, if the imaging job is a print job and the control settings are job wide and specified as Printer Job Language ("PJL"), the job control generation process may generate a sequence of commands of the following format, where "#Format . . . " is for commentary purposes only:

---

"@PJL SET <VARIABLE1>=<VALUE1># Format Independent

...

@PJL SET <VARIABLEN>=<VALUEN>

@PJL SET LPARM:<PERSONALITY><VARIABLE1>=<VALUE1>

Format Specific

...

@PJL SET LPARM:<PERSONALITY><VARIABLEN>=<VALUEN>

...

@PJL ENTER LANGUAGE=<PERSONALITY># Format Specific".

---

In addition to printing, other imaging operations that may be encompassed by the present invention include, without limitation, receiving and sending facsimile files, imaging scanned files, photocopying and document management such as object file retrieval and archiving, manipulation, conversion and transfer. The invention may be implemented on the client computing device, a server computer managing the imager or providing imaging services, the imaging device, or an intermediate device. The invention may be implemented wholly in one computing or imaging device, or distributed across multiple computing devices, imaging devices, or both.

The terms and expressions which have been employed in the foregoing specification are used therein as terms of description and not of limitation, and there is no intention, in the use of such terms and expressions, to exclude equivalents of the features shown and described or portions thereof, it being recognized that the scope of the invention is defined and limited only by the claims which follow.

What is claimed is:

1. A method for displaying for selection imaging options for direct imaging of an object file to an imaging device, comprising:

determining the type of imaging device that is to image an object file;

determining and displaying the format-independent imaging options supported by the imaging device, based on the type of imaging device;

determining the format of the object file;

displaying the imaging options supported by the imaging device that are specific to the format of the object file, based on the type of imaging device and the format of the object file; and submitting the object file directly to the imaging device for imaging, wherein the object file is not converted to a device-specific format before being submitted.

2. The method of claim 1, further comprising, in response to selection by a user of displayed imaging options, generating imaging job control settings for the imaging device.

3. The method of claim 2, wherein said generating comprises obtaining from a data base format-independent imaging settings, format-specific imaging settings, format-independent control settings, and format-specific control settings.

4. The method of claim 1, wherein the steps of determining the format and displaying the imaging options are performed for a plurality of distinct object files.

5. The method of claim 4, wherein the format-specific imaging options are grouped by object file when they are displayed.

6. The method of claim 5, wherein the format-independent imaging options and the format-specific imaging options are segregated when they are displayed.

7. The method of claim 1, wherein the format-independent imaging options and the format-specific imaging options are segregated when they are displayed.

8. The method of claim 1, wherein the format-independent imaging options are determined by querying the imaging device.

9. The method of claim 1, wherein the format-independent imaging options are determined by querying an operating system managing the imaging device.

10. The method of claim 1, wherein the format-independent imaging options are determined by querying a database having imaging option information for the type of imaging device stored therein.

11. The method of claim 1, wherein the format-specific imaging options are determined by the object file type.

12. The method of claim 1, wherein the format-specific imaging options are determined from a unique identifying form of sequences within the object file.

13. The method of claim 1, wherein the format-specific imaging options are determined by accepting format identifications provided by the user.

14. The method of claim 1, wherein the object file is obtained from a network source.

15. A method for displaying for selection printing options for direct printing of an object file; comprising:
   determining the type of printer that is to print an object file;
   determining and displaying the format-independent printing options supported by the printer, based on the type of printer;
   determining the format of the object file;
   displaying the printing options supported by the printer that are specific to the format of the object file, based on the type of printer and the format of the object file; and
   submitting the object file directly to the printer for imaging, wherein the object file is not converted to a device-specific format before being submitted.

16. The method of claim 15, further comprising, in response to selection by a user of displayed printing options, generating print job control settings for the printer.

17. The method of claim 16, wherein said generating comprises obtaining from a data base format-independent imaging settings, format-specific imaging settings, format-independent control settings, and format-specific control settings.

18. The method of claim 15, wherein the steps of determining the format and displaying the printing options are performed for a plurality of distinct object files.

19. The method of claim 18, wherein the format-specific printing options are grouped by object file when they are displayed.

20. The method of claim 19, wherein the format-independent printing options and the format-specific printing options are segregated when they are displayed.

21. The method of claim 15, wherein the format-independent printing options and the format-specific printing options are segregated when they are displayed.

22. The method of claim 15, wherein the format-independent printing options are determined by querying the printer.

23. The method of claim 15, wherein the format-independent imaging options are determined by querying an operating system managing the printer.

24. The method of claim 15, wherein the format-independent imaging options are determined by querying a database having imaging option information for the type of printer stored therein.

25. The method of claim 15, wherein the format-specific imaging options are determined by the object file type.

26. The method of claim 15, wherein the format-specific imaging options are determined from unique identifying forms of sequences within the object file.

27. The method of claim 15, wherein the format-specific imaging options are determined by accepting format identifications provided by the user.

28. The method of claim 15, wherein the object file is obtained from a network source.

29. A system for displaying for selection imaging options for direct imaging of an object file to an imaging device, comprising:
   a processor component for determining the type of imaging device that is to image an object file;
   a processor component for determining and displaying the format-independent imaging options supported by the imaging device, based on the type of imaging device;
   a processor component for determining the format of the object file;
   a processor display component for causing the imaging options supported by the printer that are specific to the format of the object file to be displayed, based on the type of imaging device and the format of the object file; and
   a processor component for submitting the object file directly to the imaging device for imaging, wherein the object file is not converted to a device-specific format before being submitted.

30. The system of claim 29, further comprising a processor component for generating imaging job control settings for the imaging device in response to selection by a user of displayed imaging options.

31. The system of claim 30, wherein said processor component for generating obtains from a data base format-independent imaging settings, format-specific imaging settings, format-independent control settings, and format-specific control settings.

32. The system of claim 29, wherein the processor components for determining the format and displaying the imaging options are adapted to do so for a plurality of distinct object files.

33. The system of claim 32, wherein the display processor component groups format specific imaging options by object file when they are displayed.

34. The system of claim 33, wherein the display processor component segregates format-independent imaging options and the format-specific imaging options when they are displayed.

35. The system of claim 29, wherein the display processor component segregates the format-independent imaging options and the format-specific imaging options when they are displayed.

36. The system of claim 29, wherein the format-independent imaging options determining component determines options by querying the imaging device.

37. The system of claim 29, wherein the format-independent imaging options determining component determines options by querying an operating system managing the imaging device.

38. The system of claim 29, wherein the format-independent imaging options determining component determines options by querying a database having imaging option information for the type of imaging device stored therein.

39. The system of claim 29, wherein the format-specific imaging options determining component determines the object file type.

40. The system of claim 29, wherein the format-specific imaging options determining component determines options from a unique identifying form of sequences within the object file.

41. The system of claim 29, wherein the format-specific imaging options determining component determines options by accepting format identifications provided by the user.

42. The system of claim 29, wherein the object file is obtained from a network source.

43. A system for displaying for selection printing options for direct printing of an object file, comprising:
- a processor component for determining the type of printer that is to image an object file;
- a processor component for determining and displaying the format-independent imaging options supported by the printer, based on the type of printer;
- a processor component for determining the format of the object file;
- a processor display component for causing the imaging options supported by the printer that are specific to the format of the object file to be displayed, based on the type of printer and the format of the object file; and
- a processor component for submitting the object file directly to the printer for imaging, wherein the object file is not converted to a device-specific format before being submitted.

44. The system of claim 43, further comprising a processor component for generating printing job control settings for the printer in response to selection by a user of displayed printing options.

45. The system of claim 44, wherein said processor component for generating obtains from a data base format-independent imaging settings, format-specific imaging settings, format-independent control settings, and format-specific control settings.

46. The system of claim 43, wherein the processor components for determining the format and displaying the printing options are adapted to do so for a plurality of distinct object files.

47. The system of claim 46, wherein the display processor component groups format-specific printing options by object file when they are displayed.

48. The system of claim 47, wherein the display processor component segregates format-independent printing options and the format-specific printing options when they are displayed.

49. The system of claim 43, wherein the display processor component segregates format-independent printing options and the format-specific printing options when they are displayed.

50. The system of claim 43, wherein the format-independent printing options determining component determines options by querying the printer.

51. The system of claim 43, wherein the format-independent printing options determining component determines options by querying an operating system managing the printer.

52. The system of claim 43, wherein the format-independent printing options determining component determines options by querying a database having printing option information for the type of printer stored therein.

53. The system of claim 43, wherein the format-specific imaging options determining component determines the options from object file type.

54. The system of claim 43, wherein the format-specific imaging options determining component determines options from a unique identifying form of sequences within the object file.

55. The system of claim 43, wherein the format-specific imaging options determining component determines options by accepting format identifications provided by the user.

56. The system of claim 43, wherein the object file is obtained from a network source.

* * * * *